(12) United States Patent
Crump

(10) Patent No.: US 8,771,770 B1
(45) Date of Patent: Jul. 8, 2014

(54) LONG LIFE DOUGH PACKAGE

(71) Applicant: Multisorb Technologies, Inc., Buffalo, NY (US)

(72) Inventor: John W. Crump, Buffalo, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 0 days.

(21) Appl. No.: 13/743,640

(22) Filed: Jan. 17, 2013

(51) Int. Cl.
*B65D 81/20* (2006.01)
*B65D 81/26* (2006.01)

(52) U.S. Cl.
CPC .................................. *B65D 81/268* (2013.01)
USPC ........... 426/124; 426/106; 426/118; 426/132; 426/231; 206/204; 206/205; 206/245

(58) Field of Classification Search
USPC .......... 426/124, 106, 118, 132, 231; 206/204, 206/205, 245
See application file for complete search history.

(56) References Cited

U.S. PATENT DOCUMENTS

| | | | |
|---|---|---|---|
| 2,329,908 A * | 9/1943 | Johnson | 312/31 |
| 2,441,477 A | 5/1948 | Farrell | |
| 3,801,011 A | 4/1974 | Guehler et al. | |
| 4,079,152 A * | 3/1978 | Bedrosian et al. | 426/124 |
| 4,454,164 A * | 6/1984 | Gellman et al. | 426/549 |
| 5,037,459 A | 8/1991 | Spruill et al. | |
| 5,342,634 A * | 8/1994 | Murata et al. | 426/113 |
| 6,767,521 B1 | 7/2004 | Vogt et al. | |
| 6,921,026 B2 * | 7/2005 | Saari et al. | 239/53 |
| 7,501,011 B2 | 3/2009 | Powers et al. | |
| 7,959,719 B2 | 6/2011 | Powers et al. | |
| 2002/0014305 A1 | 2/2002 | Dick et al. | |
| 2003/0203081 A1 | 10/2003 | Saari et al. | |
| 2004/0241290 A1 | 12/2004 | El-Afandi | |
| 2006/0097223 A1 | 5/2006 | Powers et al. | |
| 2009/0208615 A1 * | 8/2009 | Domingues et al. | 426/107 |
| 2009/0232948 A1 | 9/2009 | Campillo et al. | |

FOREIGN PATENT DOCUMENTS

| | | |
|---|---|---|
| EP | 0335682 | 10/1989 |
| EP | 1043247 | 10/2000 |
| EP | 1 000 873 B1 | 11/2003 |
| WO | 03/086900 A1 | 10/2003 |

OTHER PUBLICATIONS

PCT Search Report and Written Opinion mailed May 14, 2014 for PCT Application No. PCT/US2014/011827, 10 pages.

* cited by examiner

*Primary Examiner* — Anthony Weier
(74) *Attorney, Agent, or Firm* — Lee & Hayes, PLLC

(57) ABSTRACT

This invention relates to a packaging material for unbaked dough products which includes a container that is impermeable to water vapor transmission, a relative humidity control device in the container, dough, and a water permeable sheet forming a cover for the container wherein the relative humidity control device includes a water vapor permeable container containing a solidified humectant composition which further includes a humectant salt, water and carrier.

11 Claims, 2 Drawing Sheets

LONG LIFE DOUGH PACKAGE

FIELD OF THE INVENTION

The disclosed invention relates to humidity control in a package and more particularly to humidity control in packaging of a dough product.

BACKGROUND OF THE INVENTION

Traditionally, deliquescent compounds, usually salts, are used to reduce relative humidity in a closed environment. It is well known that different compounds have varying affinity for moisture. For example, each deliquescent compound has a characteristic capacity for moisture adsorption and a characteristic equilibrium relative humidity (ERH) when hydrated.

Desiccants can be considered humidity controllers in that they have been used to completely (or almost completely) remove all water vapor from the air from a closed system. An effective desiccant in sufficient quantity will adsorb water vapor from the air in a package, lowering the equilibrium relative humidity (ERH) to the point where condensation will no longer occur, or to a point where the threshold ERH within a sealed package or system is never exceeded under the conditions to which the package or system will be exposed. A larger quantity of an effective desiccant will reduce water vapor in a closed system well below the dew point to where the relative humidity of the system matches the ERH of the desiccant at its current degree of hydration.

However, there are applications (food, pharmaceutical, analytical, medical diagnostics, to name a few) where a desiccant is not the best alternative. In such cases, ERH of the product must be maintained at some specific intermediate level, rather than near zero. A common and economical method of controlling humidity in moist environments is the use of humectant compounds. Inorganic salts are the most effective and are most often used, although many deliquescent or hydratable compounds can be used in an appropriate system. These compounds have an affinity for water that regulates the water vapor pressure in the atmosphere within a closed vessel or chamber. In essence, such compounds will adsorb moisture until they go completely into solution. As this occurs, a mixture of solid salt and salt solution will coexist. This solution will be saturated and will have an ERH characteristic of the particular salt or compound used.

The specific humectant in such cases is chosen based on the desired equilibrium relative humidity (ERH). The salt may be single in nature, such as lithium chloride. A mixture of two salts may also be used. As an example, a solution of potassium carbonate has a relative humidity of about 43%. Therefore, a solution of potassium carbonate with excess undissolved crystals of potassium carbonate will maintain a constant relative humidity of approximately 43%. If the relative humidity begins to rise above 43%, the salt solution would pick up moisture from the environment thus lowering the relative humidity closer to 43%. Conversely, if the relative humidity begins to fall below 43%, the solution would release moisture until the surrounding environment reaches approximately 43%. The ERH values for different saturated aqueous salt solutions can vary from 11% to 98%.

DESCRIPTION OF RELATED ART

U.S. Pat. No. 7,959,719—Powers and U.S. Pat. No. 7,501,011—Powers disclose that a solidified water vapor absorbing composition including a carrier may be utilized for providing water absorption in a sealed package.

U.S. Pat. No. 3,801,011—Guebler et al discloses humidity control using a sheet carrier containing capsules that absorb water.

U.S. Pat. No. 5,037,459—Spruill discloses an insert for inclusion in a sealed container for controlling the relative humidity in a container.

U.S. Pat. No. 6,767,521—Vogt discloses a system with a dehumidifying and deodorizing a pouch.

Problem to be Solved by Invention

There's a need for packaging of dough products that will not allow them to dry out, but also not allow water formation in the package which will at least cosmetically deteriorate the product and make the package less desirable to the consumer.

BRIEF SUMMARY OF THE INVENTION

It is an object of the invention to provide an effective package for storing dough products.

This invention relates to a packaging material for unbaked dough products which includes a container that is impermeable to water vapor transmission, a relative humidity control device in the container, dough, and a water permeable sheet forming a cover for the container wherein the relative humidity control device includes a water vapor permeable container containing a solidified humectant composition which further includes a humectant salt, water and carrier.

Advantageous Effect of the Invention

This invention provides a package that successfully keeps dough products from drying out and from becoming spoiled or discolored by the presence of water in the package. Further the products remain visible as water is not condensed on the transparent portions of the package.

BRIEF DESCRIPTION OF THE SEVERAL VIEWS OF THE DRAWING(S)

DETAILED DESCRIPTION OF THE INVENTION

The invention has significant advantages over prior art packaging of dough materials. The invention provides a package that will not have water condensed on the transparent viewing area. Further, water will not drop onto the dough and leave discoloration and spots. The package of the invention does not allow drying of the dough materials. The package maintains the humidity (ERH) in the package of at least 90% and below 100%. The dough material retains its flexibility. Flexibility is particularly important when packaging Asian food wrap material such as wonton and eggroll wrappers. Further, the present package is low in cost and can use selected present packaging materials. These and other advantages will be apparent from the detailed description and drawings. The term "dough" is intended to include uncooked materials made of flour, of wheat, rice, oats, bran or other grains, that is mixed with water and possibly other additives, such as butter, salt, sugar, or fruit to form a mass that normally is cooked prior to use.

Figure 1:
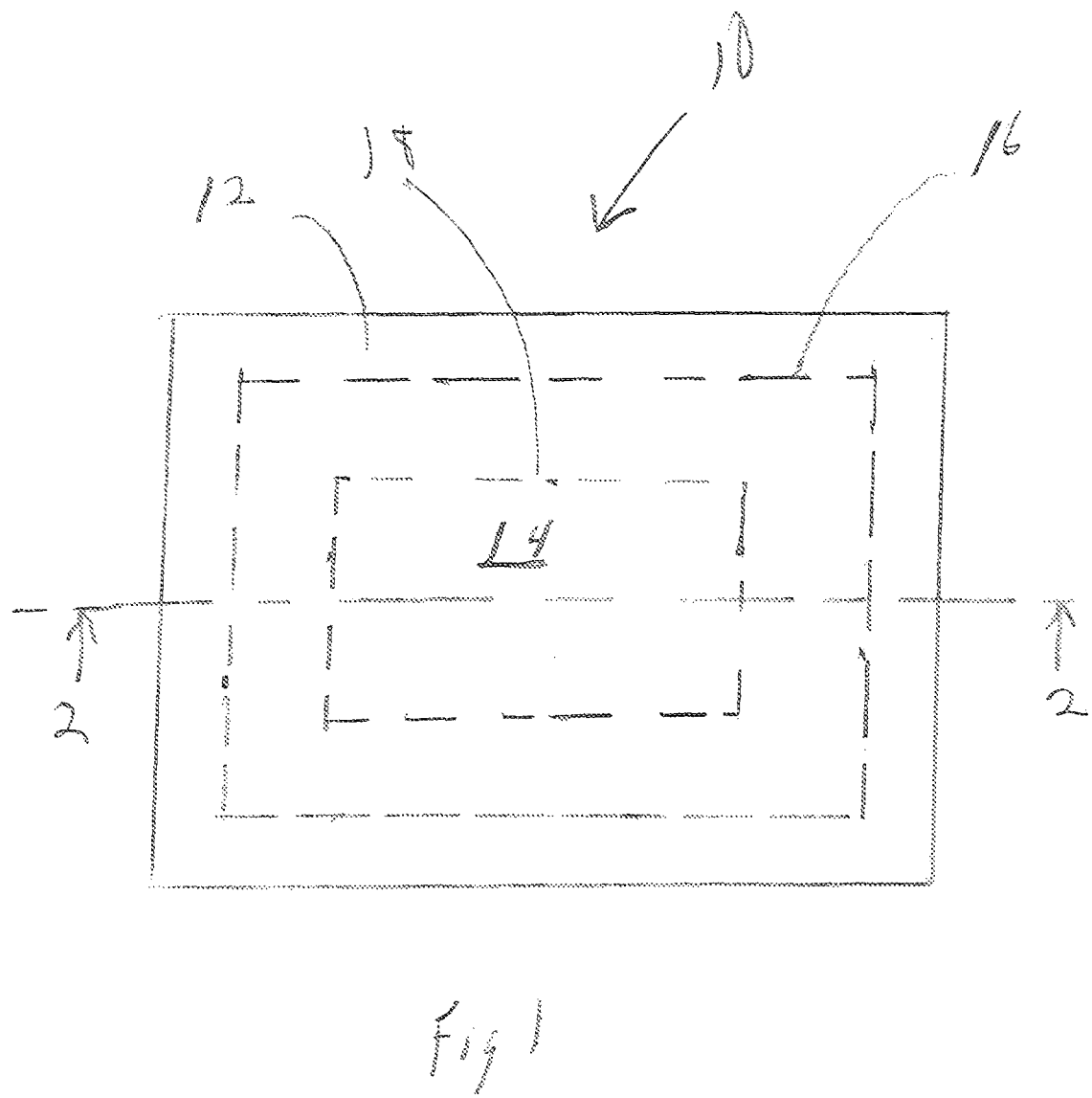
FIG. 1 is a top view of a package in accordance with the invention.
Figure 2:
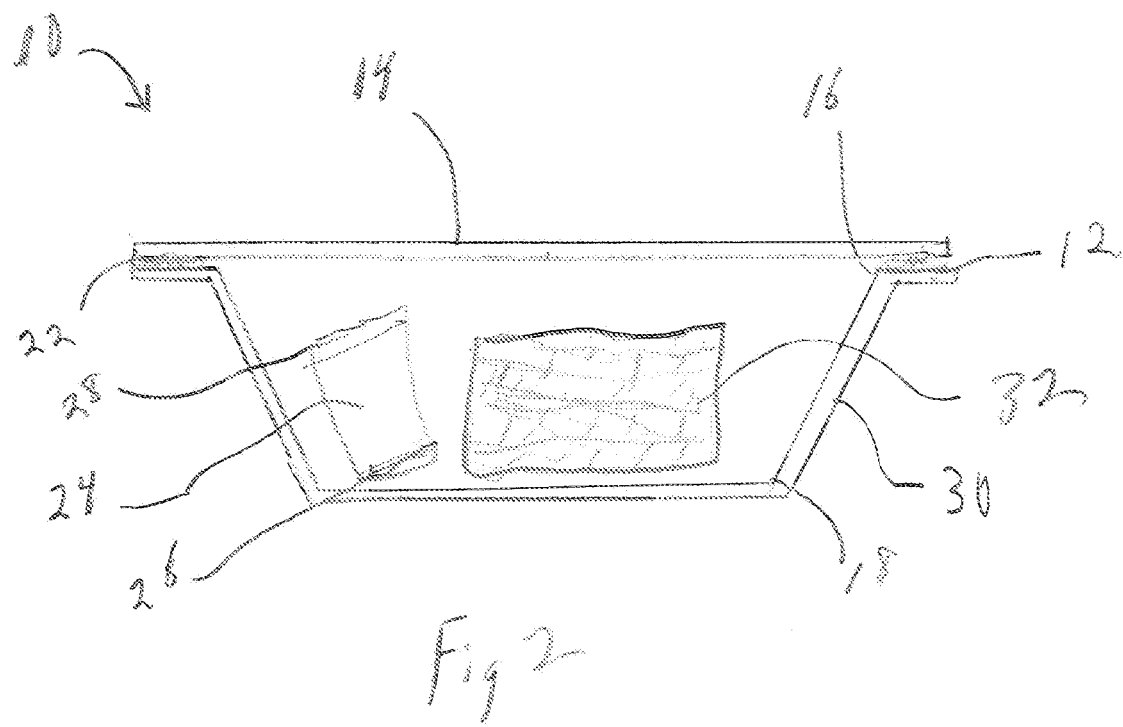
FIG. 2 is a cross-sectional view of package containing the humidity control device and the dough.

FIG. 1 is a top view of a package 10. The container 30 has a sealed edge 12 and a transparent covering 14. The upper inside edge of the container 16 joins the edge 12. The bottom of the edge of the container is indicated as 18. FIG. 2 is a cross-sectional on line 2-2 of FIG. 1.

In FIG. 2, the transparent covering 14 is sealed by an adhesive 22 between the sheet 14 and the edge 12 of the container 30. The covering layer 14 is water vapor permeable in order to decrease the condensation on the inside of the container 30. The cover 14 is usually a transparent sheet. The package 30 contains a dough product 32 and a sachet 24 that contains the humidity control material. The sachets are sealed at their ends 28 and 26.

It is surprising that the package of the invention is effective in maintaining dough materials for long periods of time in storage even though the package top is somewhat pervious to water vapor. While not wishing to be bound by any theory it is believed that when fresh the dough or asian wrap materials will have a very high water content and will give off water as the dough cools and adjusts to storage. This water will condense on the package and possibly drip onto the dough where it will cause discoloration and possibly spoilage. Because the initial excessive water is dissipated both by the absorption of the humidity control material and by water vapor passing through the lid of the container, the package remains substantially clear and liquid water will not be present in the container. After the initial release of water the excess water in the humidity control device will be approaching 99% of saturation of the device. As the material is in storage water will be given out as the dry refrigeration and vapor permeable member transparent member combine to slowly remove water vapor from the package. However, as there is excess water in the salt the shelf life of the product is still significantly extended and the product is not damaged by excess water, while maintaining transparency of the viewing film 14.

The breathable cover 14 may be formed of any suitable material which will pass water vapor and allow viewing of the contents. Typical of such materials are ethylene polymers, acetate, microporous polytetrafluoroethylene films and spun-bonded microporous film such as Gore-Tex. The preferred cover material will have resistance to passage of oxygen. The cover sheet will pass water vapor as it is permeable, low cost and strong. A preferred 1 mil polystyrene cover will have a permeability of about 7.2 gm./100 sq. in./24 hours. The preferred cover material is polystyrene or a polyester sheet with a permeability between 2 and 20 gm/100 sq. in/24 hours (MVTR).

The container 30 may be formed of any material that is generally impervious to oxygen, water, and water vapor. Typical of such materials are polyvinyl acetate and polycarbonate. The container further may be thermoformed from a laminated group of materials including at least one oxygen and water barrier film formed of a material such as ethylene vinyl alcohol or a metal such as aluminum.

The humectant and carrier utilized in the invention may be any suitable material. In a preferred form, the humectant is a generally solid form to eliminate the possibility of leakage, spillage or seepage of the humectant and resultant damage to the product or materials the humectant is designed to protect. This preferred package provides a stable, solid-form material, free-standing or in a vapor-permeable container for controlling relative humidity in a closed system such that the product or materials held within the package are protected and not degraded, denatured, or soiled in any manner.

This is accomplished by stabilizing or solidifying the saturated humectant to provide a packaged humidity control device that will not seep water or water solution or the humectant itself. Use of a solid humectant compound controls a closed environment at a desired humidity and below the dew point as well, preventing the possibility of condensation.

Another aspect of the preferred package provides additional functionality to the solid state, moisture regulation system. As an example, a basic salt may function as a humectant and also function to neutralize volatile acids that may exist within a package, or which may evolve from the product within the package. It can be appreciated that salts may simultaneously function to regulate moisture within a system and buffer the system, or provide a reducing environment in which oxygen is scavenged from a closed system.

In an exemplary embodiment of the present invention, the solidified form containing the humectant salt may also include an antimicrobial preservative which will control growth of microorganisms within the humectant package. Further, by choosing an antimicrobial agent that has some volatility and is compatible with the container, vessel, chamber, or package and its contents, the entire closed system can be protected from microbiological degradation.

The humectant compound or salt solution in accordance with the present invention is preferably prepared at a predetermined solution temperature by introducing distilled water slowly to a specific salt with constant stirring. The solution should visually appear to be "slush-like," which reflects the presence of excess salt crystals that are undissolved. Careful preparation of the salt solution is necessary, as this dictates accurate attainment of the anticipated and desired humidity level. The humidity control material of the invention preferably has a water activity of between 0.93 and 0.98 for good storage of high moisture materials.

Alternatively, a true solution may be prepared and solidified or impregnated into a solid carrier phase and then partially dried to the point of supersaturation at which point excess salt may be expected to precipitate out leaving a saturated solution with excess salt. The proportion of excess salt to saturated solution will determine the amount of moisture which may be adsorbed or released within a given system in its functional humidity range. Where the service environment is expected to be higher in humidity than the ERH of the humectant, it may be desired to completely dry the impregnated or solidified humectant to maximize adsorption capability.

A preferred embodiment of the present invention includes an antimicrobial agent within the container. Preferably, the antimicrobial agent is added to the humectant salt solution. This is a preferred embodiment because microbial growth, most commonly mold, can be a factor contributing to degradation of many moist packaged products.

As noted above, the humectant salts of the present invention are present in the form of saturated solutions. The solution is then solidified (stabilized) by adding it to a carrier medium. The carrier may be a cellulose, silica gel, clay, carbon, carbohydrate or protein gelling agent, hydrocolloid like carrageenan or alginate, gum like konjac, hydrophilic polymer like acrylate or polyvinyl alcohol, or any other material that will stabilize, solidify, encapsulate or adsorb the humectant in a solid state. This solid-form humectant may then be sealed into a suitable container in accordance with the invention and used in a package without danger to the food contents of the package.

In a preferred embodiment of the present invention, a packaged, hydrocolloid-solidified humectant is contained within a felt envelop, the combination of which is placed into a closed environment housing a moisture sensitive analytical reagent. A preferred single salt is potassium sulfate, as a solution of potassium sulfate can provide an ERH of approximately 98%

(at temperatures under 20.degree. C.). In this case the humectant serves as a moisture source while maintaining a non-condensing atmosphere within the sealed chamber.

As noted above, the solidified humectant may be contained within a vapor permeable container designed to be compatible with the sealed system package for which humidity control is desired. The container interface must allow for sufficient moisture permeability between the solidified humectant and the product and its environment within the package, while securely containing the solidified humectant. Typical containers can take the form of a canister or perforated rigid or semi-rigid vessel, or a sachet made with a micro-perforated polyester/paper/polyethylene structure or a woven or nonwoven material.

In an alternative preferred embodiment of the present invention, the solidified humectant can be formed into a tablet through the inclusion of an appropriate binder in the composition. The binder could be a separate element in addition to a carrier noted above. For example, the carrier could be silica gel, and the binder could be any of a known number of binders, such as polyvinylpyrollidone, a cellulose ether resin, a thermoplastic polymer or a wax. Alternatively, the binder could serve also as the carrier if present in adequate amounts to stabilize and solidify the humectant salt.

This tableted humectant can be used as is without further packaging, or it may be contained. It could be contained as noted above, or coated with a vapor permeable coating for added durability (as compared to just using the tableted humectant). In such a case where a coating is desired, the tablet can be coated with a suitable water vapor permeable coating. Appropriate such coatings would include powdered polymers such as polyethylene or polytetrafluoroethylene, coated dry or in suspension followed by heat curing. Alternatively, the tableted humectant could be resin coated such as with polyvinylpyrollidone or a cellulose ether followed again by a drying and curing step.

As noted above the humidity control device may include a biocide. The humectant also may include other materials such as fungicides, colorants, and surfactants to aid in combination with the carrier. In some instances it may include an oxygen scavenger.

Further, while illustrated with the package of FIGS. 1 and 2, other packages, pouches, and bags could be utilized in the invention. The pouches if necessary could be provided with an area of water vapor permeable polymer that would not necessarily need be the transparent portion of the bag or pouch.

The Examples are representative of packages of the invention, but are not exhaustive of the possibilities of this invention.

Example 1

The materials to form a material for use in packaging dough are mixed as in Table 1:

|  | Grams | Percentage (%) |
|---|---|---|
| Water | 150.13 | 80.60671 |
| Sodium Propionate | 0.12 | 0.06443 |
| Potassium Sulfate | 18 | 9.66443 |
| Carragenean | 18 | 9.66443 |
| Total | 186.25 | 100 |

This material has a water activity of between 0.93 and 0.98. Forty grams of the mixture of Table 1 is placed in a sealed sachet of polypropylene microporous film (Tyvek®). The sachet is placed in a container as in FIG. 2. Four ounces of won-ton wrappers are also placed into the container. The container and the water vapor permeable top are formed of polyester with an MVTR of about 7. The container is sealed with oxygen purge by nitrogen. After 90 days storage the won-ton wrappers have not dried out.

The invention claimed is:
1. A package for a dough product comprising:
   an outer container that is impermeable to water vapor and having an opening;
   a relative humidity control device that includes a water vapor permeable inner container containing a solidified humectant composition comprising a humectant salt, water and a carrier disposed in the outer container;
   a dough product in the outer container; and
   a water vapor permeable cover closing the opening in the outer container.
2. The package of claim 1, wherein the humectant salt comprises potassium sulfate.
3. The package of claim 1, wherein when the relative humidity in the package is maintained at between 90 and 99%.
4. The package of claim 1, wherein the water vapor permeable cover comprises a transparent or translucent sheet.
5. The package of claim 1, wherein the cover comprises an acetate sheet.
6. The package of claim 1, wherein the container comprises polyvinyl chloride polymer or polycarbonate polymer.
7. The package of claim 1, wherein the cover has a water permeability of between 2 and 20 gm/100 sq. in./24 hours.
8. The package of claim 1, wherein the relative humidity control device comprises at least one of a biocide and a fungicide.
9. The package of claim 1 wherein the relative humidity control device comprises at 95% humidity has a solid portion of humectant salt and has a liquid portion of the humectant salt in water.
10. The package of claim 2, wherein the dough product comprises wonton wrappers.
11. The package of claim 1 wherein the relative humidity control device has a water activity of between 0.93 and 0.98.

* * * * *